(12) United States Patent
Connors

(10) Patent No.: US 6,338,680 B1
(45) Date of Patent: Jan. 15, 2002

(54) METHOD FOR EDITING GAME SAVES TRANSFERRED BETWEEN A GAME CONSOLE AND A COMPUTER

(75) Inventor: Michael Connors, Staffordshire (GB)

(73) Assignee: Datel Electronics Ltd., Staffordshire (GB)

( * ) Notice: Subject to any disclaimer, the term of this patent is extended or adjusted under 35 U.S.C. 154(b) by 0 days.

(21) Appl. No.: 09/321,539

(22) Filed: May 28, 1999

(51) Int. Cl.$^7$ .......................... A63F 13/00; A63F 9/24; G06F 17/00; G06F 19/00

(52) U.S. Cl. ..................... 463/43; 463/44; 463/45; 463/47; 273/148; 345/115; 345/116; 345/149; 345/150; 345/152; 710/3; 710/4; 710/5; 710/9; 710/13; 710/20; 710/65; 710/102

(58) Field of Search .................... 463/43, 44, 45, 463/46, 47, 36, 37, 40, 42, 24, 25, 31, 34; 273/148 B, 453, 460, 461; 345/133, 115, 116, 149, 152, 150, 333, 334, 348, 508, 511; 700/90, 91; 710/3, 4

(56) References Cited

U.S. PATENT DOCUMENTS

| | | | | |
|---|---|---|---|---|
| 4,570,930 A | * | 2/1986 | Matheson | 273/1 E X |
| 4,588,187 A | * | 5/1986 | Dell | 273/1 E X |
| 4,858,930 A | * | 8/1989 | Sato | 273/85 G X |
| 5,259,626 A | * | 11/1993 | Ho | 273/438 X |
| 5,261,820 A | * | 11/1993 | Slye et al. | 434/43 X |
| 5,396,225 A | * | 3/1995 | Okada et al. | 340/825.21 X |
| 5,586,257 A | * | 12/1996 | Perlman | 463/42 X |
| 5,752,883 A | * | 5/1998 | Butcher et al. | 463/43 |
| 5,760,788 A | * | 6/1998 | Chainini et al. | 345/474 X |
| 5,785,597 A | * | 7/1998 | Shinohara | 463/43 |
| 5,808,591 A | * | 9/1998 | Mantani | 345/82 X |
| 5,809,520 A | * | 9/1998 | Edwards et al. | 711/115 X |
| 5,816,917 A | * | 10/1998 | Kelmer et al. | 463/16 X |
| 5,816,921 A | * | 10/1998 | Hosokawa | 463/43 X |
| 5,961,386 A | * | 10/1999 | Sawaguchi | 463/43 X |
| 6,007,428 A | * | 12/1999 | Nishiumi et al. | 463/36 X |
| 6,048,270 A | * | 4/2000 | Chiu-Hao | 463/45 X |
| 6,132,315 A | * | 10/2000 | Miyamoto et al. | 463/43 |
| 6,147,696 A | * | 11/2000 | Smith et al. | 345/508 X |
| 6,171,187 B1 | * | 1/2001 | Audebert et al. | 463/37 X |

OTHER PUBLICATIONS

Patch Savegame Editor (Freeware, Version 3.07, Jan. 7, 1999 by Matthew Inman).*
Savegame Editor Construction Kit (SECK) (Shareware, Version 2.0, Oct. 1, 1996 by ADT Software).*
DeeP for DOS (Shareware, Version 8.8476, Nov. 5, 1997 by Sensor Based Systems, Inc.).*
DeeP97 (Shareware, Version 9.75, Oct. 10, 1998 by Sensor Based Systems Inc.).*
qED–Lite (Shareware, Version 1.0970615, Jun. 15, 1997 by Worldwide MicroTronics Inc.).*

* cited by examiner

Primary Examiner—Jessica J. Harrison
Assistant Examiner—Binh-An D. Nguyen
(74) Attorney, Agent, or Firm—Leydig, Voit, & Mayer, Ltd.

(57) ABSTRACT

A system for transferring game saves between a game console and a personal computer. The system includes a game save editor that allows a user to edit game saves stored in memory of a computer. The game save may be obtained from a hard disk of a personal computer or a memory card in a game console.

8 Claims, 8 Drawing Sheets

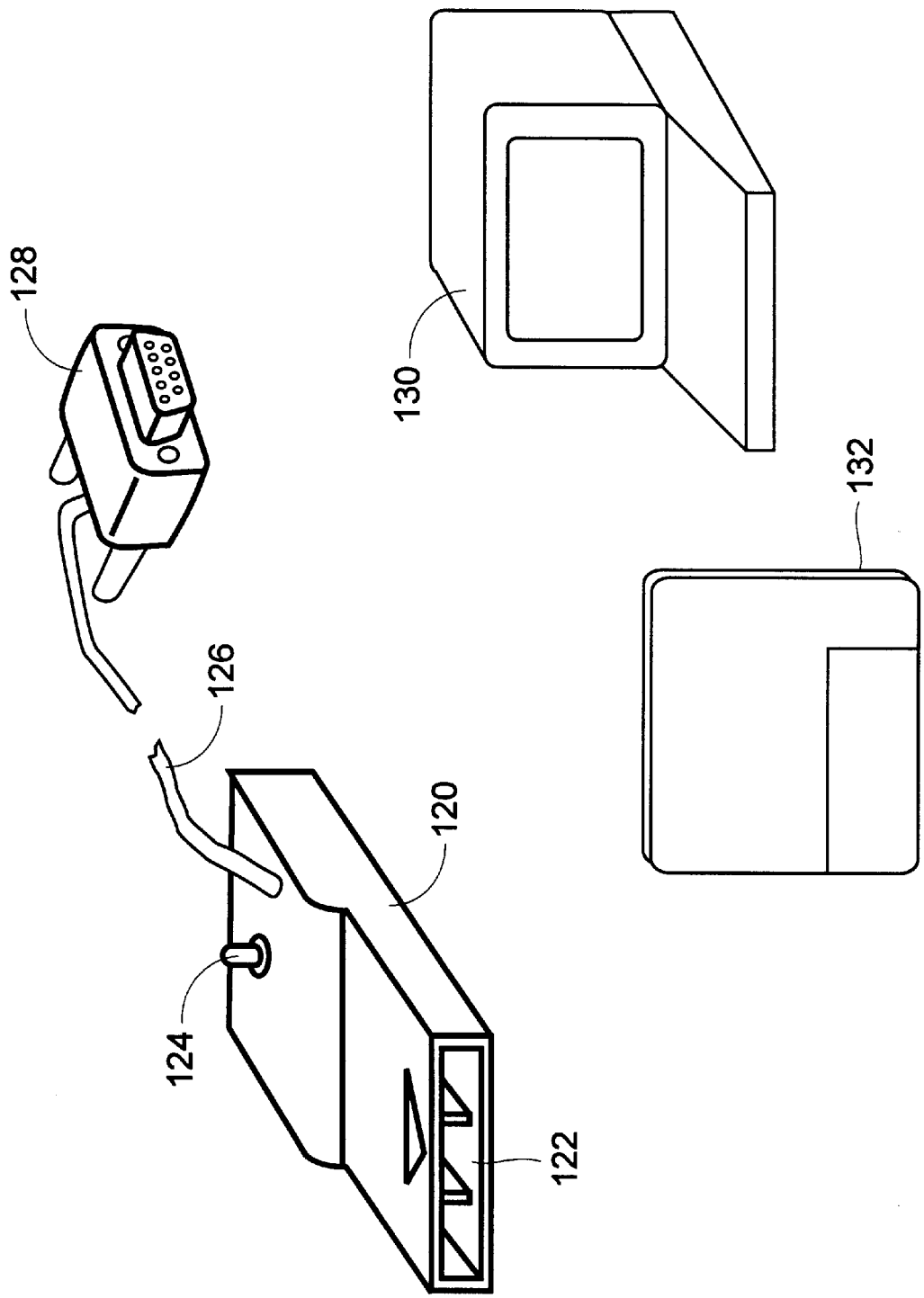

METHOD FOR EDITING GAME SAVES TRANSFERRED BETWEEN A GAME CONSOLE AND A COMPUTER

TECHNICAL FIELD

The present invention relates to methods and systems for transferring game saves between a game console and a computer and for editing game saves using the computer. More particularly, the present invention relates to methods and systems for transferring game saves from a game console to a personal computer, storing game saves in memory associated with a personal computer, editing the game saves stored in the memory, and transferring game saves from the personal computer to a game console.

BACKGROUND OF THE INVENTION

In electronic game systems, such as the "PlayStation" game system available from Sony Corporation or the "Nintendo 64" game system available from Nintendo Company, some games allow a user to save information relating to a particular state of a game on a game system memory card. This information is commonly referred to as a game save. Game saves allow users to recreate the state of a game program at the point where a previous instance or execution terminated. For example, an electronic football game program, such as "John Madden Football" for the Sony "PlayStation" may allow a user to play a simulated football season and save statistical information regarding the user's team at a given point in the season. During one execution of the game program, the user may play the first three football games of a simulated season and save statistical information for the user's team at that point in the simulated season. If the user's team wins the first three games, the team win/loss record of three wins and zero losses may be stored on the game system memory card along with additional operating information, so that the game program, stored on a separate cartridge or disk, can restart at the point where the previous execution of the game program terminated. Thus, when the user restarts the game program, the user inserts the game system memory card with the game save into the game console. The game cartridge or disk must also be inserted in the game system console, since game saves generally do not contain all of the information needed to execute a game program. The game console reads the game save on the game system memory card and the game cartridge or disk and starts the game program at the point where the user finished in the previous instance. Thus, in sports games, storing game saves on game system memory cards avoids the necessity of restarting the entire season each time the user plays the game. Game saves may be used in a similar manner in adventure games and other games to allow restarting at a previous state of a game program.

Although storing game saves on game system memory cards has a number of advantages, the storage capability of a single game system memory card is limited. For example, in one game system memory card configured to store game saves for the "PlayStation" game system, the memory card is limited to fifteen blocks of game storage space. A game save requires at least one block of memory. Some game saves require multiple blocks of memory. Thus, a fifteen-block game system memory card may store, at most, fifteen game saves.

Similarly, in game system memory cards configured to store game saves for the "Nintendo 64" game system, memory space is divided into pages. A memory card has a finite number of pages. Game saves may require one or more pages. Thus, the number of game saves that can be stored on a game system memory card configured to store game saves for the "Nintendo 64" game system is also limited. Because the user may desire to store multiple game saves for a single game or for multiple games, the user may be required to purchase multiple game system memory cards or game system memory cards with increased storage capacity.

Storing game saves exclusively on game system memory cards may limit a user in sharing game saves with another user to physically transferring the game system memory card, including the game saves, to another user. For example, a first user who achieves a high level in an adventure game may save the information required to replay the game at the same level as a game save on a game system memory card. In order for the first user to transfer the game save to a second user so the second user can start at the high level, the first user physically transfers the game system memory card to the second user. The second user inserts the game system memory card in his or her game system console in order to start the game at the high level.

While the second user is using the first user's game system memory card, the first user is prevented from accessing the game save or from storing further game saves on the game system memory card. In addition, the first user may lose his or her game save because the second user may erase or write over game saves on the game system memory card.

Some game system consoles, such as the Sony "PlayStation" game console, have two memory card slots to allow copying of game saves from one game system memory card to another game system memory card. However, even with this mechanism, game saves cannot be shared without physical transfer of a game system memory card. For example, a first user may have two game system memory cards. In order to transfer game saves to a second user, the first user may copy game saves from one game system memory card to the other memory card using the game system console and lend the game system memory card with the copy to the second user. In another scenario, two users may each have a single game system memory card. In order to transfer game saves, the second user may lend his or her game system memory card to the first user, the first user may copy game saves from his or her game system memory card to the second user's game system memory card. The first user may then return the second user's game system memory card. In either scenario, physical transfer of a game system memory card is required to share game saves. Because of the limited storage capacity of game system memory cards and the inability to communicate game saves to other users without physically transferring game system memory cards, there exists a need for an alternate mechanism for transferring and storing game saves.

Another problem with conventional game systems is that, even though some game systems allow a user to store game saves and return to a previous place in a game, the game saves are limited by the user's ability to play the game. For example, if a user playing an adventure game achieves a certain level during an instance of the game, the game save for that instance is limited to the level that the user achieved. If the user is incapable of achieving a higher level when playing the game, the next time the user starts the game from the game save, the user may not be capable of achieving a higher level. Accordingly, there exists a need for methods and systems for altering game save information to allow users to achieve higher levels in a game without first playing all of the lower levels of the game to achieve the higher levels.

SUMMARY OF THE INVENTION

It is an object of the invention to provide a system for transferring game saves between a game console and a personal computer and, particularly, to provide a method of editing game saves.

According to one aspect of the invention, a game save editor comprising a computer program product embodied in a computer-readable medium for performing steps comprises reading a game save, including game same information, stored in a memory associated with a personal computer; displaying the game save information in at least one of ASCII and binary format to a user; changing the displayed game save information based on input from the user; and storing in the memory of the computer the displayed game save information changed by the user as an edited game save.

In another aspect of the invention, a graphical user interface displayable on an electronic display device for controlling transfer of game saves between a personal computer and a game system memory card and editing of a game save comprises: a first display area for displaying a game save as game save information in binary format; a second display area for displaying the game information in ASCII format; and means for editing the game save information in either of the first and second areas, editing one of the first and second areas automatically editing the other of first and second areas.

According to a third aspect of the invention, a system for transferring game saves between a game system and a personal computer and for editing game saves using the personal computer, the system comprises: a connection device for connecting a game system to a computer; and a computer-readable medium having computer executable instructions for performing steps comprising: reading a game save, including game same information, stored in memory associated with a personal computer; displaying the game save information in at least one of ASCII and binary formats to a user; changing the displayed game save information based on input from the user; and storing in the memory of the personal computer the displayed game save information changed by the user as an edited game save.

According to still another aspect of the invention, a system for transferring game saves between a game system and a personal computer comprises a connection device for connecting a game system to a computer, the connection device including a first interface for communicating with a computer; a second interface for communicating with a game system through a memory card port; and a processing circuit coupled to the first and second interfaces for transferring game saves between the computer and the game system.

BRIEF DESCRIPTION OF THE DRAWINGS

FIG. 7 is a pictorial view of an embodiment of a system according to the present invention.

DETAILED DESCRIPTION OF THE INVENTION

As used herein, the term "game console" refers to a device in a video game system that reads a game program from a storage medium, such as a read only memory or an optical disk, displays the game on a video display device, such as a cathode ray tube, and allows a user to interact with the game through an input device, such as a joystick. The game console may also include one or more memory card interfaces for transferring game saves to and from a game system memory card. Examples of commercially available game consoles include the Sony "PlayStation" game console and the "Nintendo 64" game console. In some of these systems, the connector for receiving a game system memory card may be located on a controller connected to the console. Since the controller is connected to the console for operation, the controller is considered an extension of, i.e., part of, the console.

Figure 1:
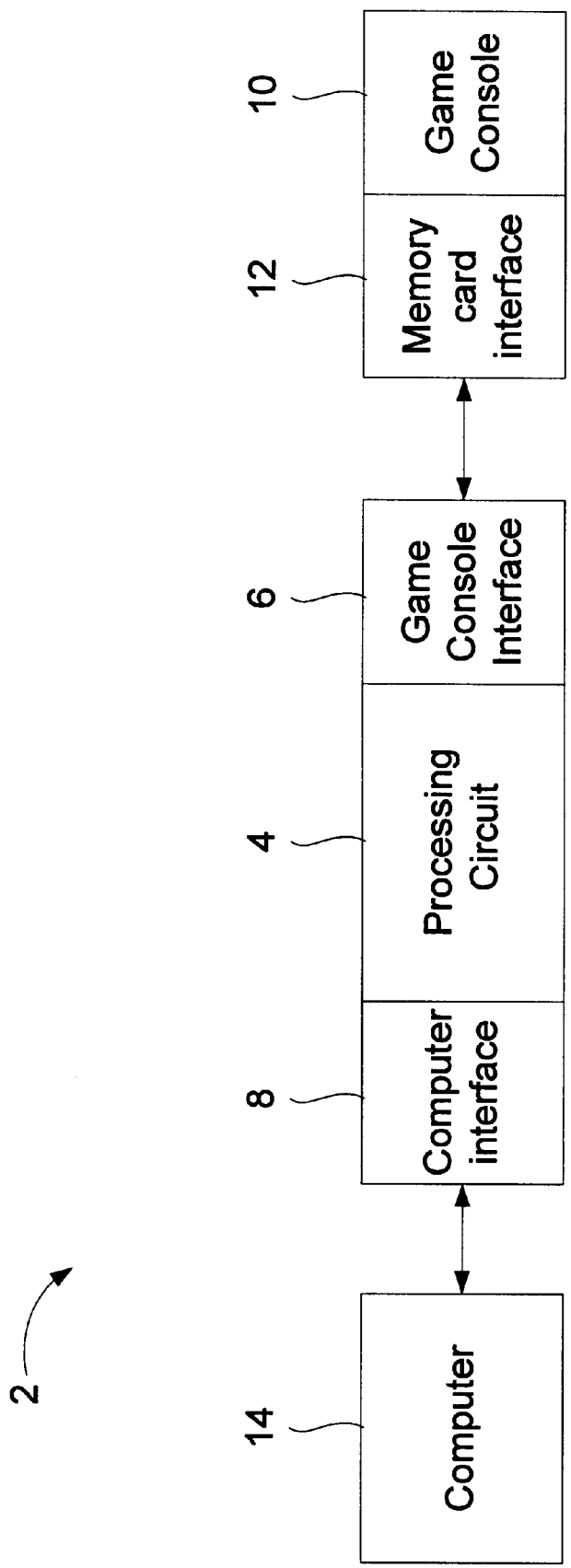
FIG. 1 is a block diagram of a system for transferring game saves between a personal computer and a game console according to an embodiment of the present invention.

FIG. 1 illustrates a system for transferring game saves between a personal computer and a game console according to an embodiment of the present invention. The system includes a game save transfer device 2. The game save transfer device 2 includes a processing circuit 4 having a game console interface 6 and a computer interface 8. The game console interface 6 communicates with a game console 10, preferably through a direct connection to the game console or a game controller. For example, the game console interface 6 may communicate with a memory card interface 12 of the game console 10 to receive game saves from the game console 10 and transfer game saves to the game console 10. In game systems where the memory card interface is located in a game controller connectable to the game console, the game console interface may communicate with the memory card interface in the game controller.

The computer interface 8 may be any type of interface capable of communicating with a computer 14, such as a personal computer, to send game saves to and receive game saves from the computer 14. For example, the computer interface 8 may communicate with a serial port of the computer 14, a parallel port of the computer 14, or any other port or interface of the computer 14 capable of sending game save data to and receiving game save data from the game save transfer device 2.

The game save transfer device 2 may be located within or external of the computer 14. For example, the game save transfer device may comprise an adapter card connectable to an internal computer bus, such as a PCI bus. In a preferred embodiment, the game save transfer device is external to the computer and connects to the computer serial port through a cable.

Figure 2:
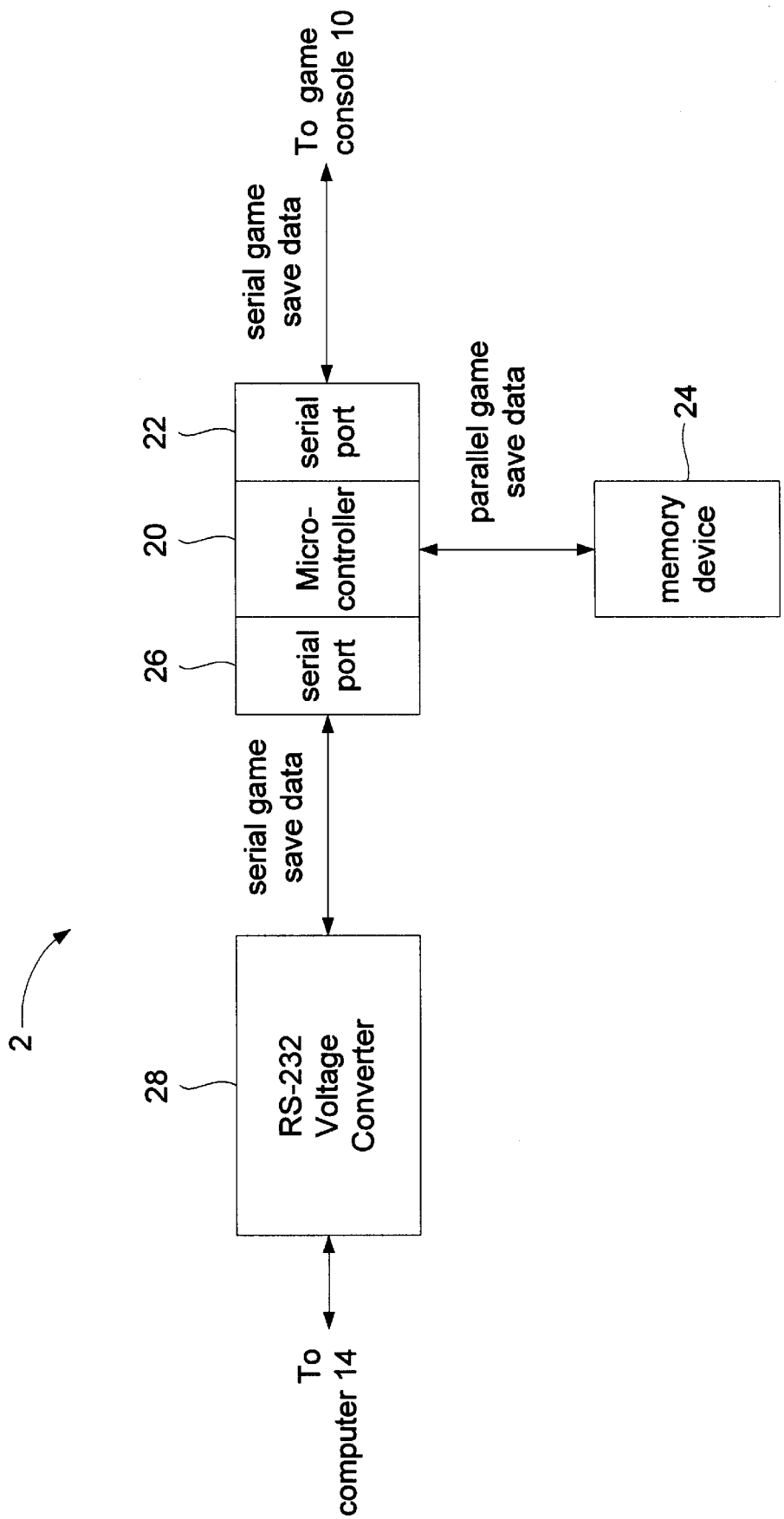
FIG. 2 is a block diagram of a game save transfer device according to the embodiment of FIG. 1.

FIG. 2 is a more detailed block diagram of the game save transfer device 2 according to the embodiment of FIG. 1. In FIG. 2, the processing circuit of the game save transfer device 2 comprises a microcontroller 20. In a preferred embodiment, the microcontroller 20 comprises a PIC16C64A available from Microchip Technology, Inc. The present invention is not limited to using the PIC16C64A microcontroller. Any microcontroller or equivalent circuitry suitable for communicating with a computer and a game console is within the scope of the invention.

In the illustrated embodiment, the game console interface 6 illustrated in FIG. 1 comprises a serial port 22 of the microcontroller 20. The serial port 22 sends game save data to and receives game save data from the game console 8. For example, the microcontroller 20 may include a program stored in read only memory that instructs the microcontroller 20 to emulate a conventional game system memory card. In order to emulate a game system memory card, the program may instruct the microcontroller to send game saves to and receive game saves from the memory card interface of the game console in response to read and write signals from the game console. The read and write signals may be produced in response to user input to the game console to read game saves from or write game saves to a game system memory card. The particular format of the read and write signals depends on the type of game console with which communication is desired.

The game save transfer device 2 may connect to the memory card interface of the game console in any suitable manner, such as through a cable having a connector connecting to the memory card connector of the game console. In embodiments of the game save transfer device configured to send game saves to and receive game saves from a Sony "PlayStation" game system, the connector may include eight conductors that correspond to conductors in a memory card connector of the "PlayStation" console. In such an embodiment, the game save transfer device may receive power from the game console.

The present invention is not limited to sending game saves to and receiving game saves from the game console through the memory card interface of the game console. For example, if the game console includes another interface through which game save data is accessible, the game save transfer device may send game saves to and receive game saves from that interface.

In order to store game save data received from the game console 8 and/or the computer 14, the game save transfer device includes a memory device 24. The memory device 24 may be any type of memory device capable of storing game save data. The memory device 24 is preferably nonvolatile so that the memory device 24 retains game save data when the game save transfer device is disconnected from an external power source, such as the game console or the computer.

In a preferred embodiment, the memory device 24 comprises a flash memory. In an alternative embodiment, the memory device may comprise a volatile memory. In such an embodiment, the game save transfer device may include an internal power source, such as a battery, to maintain game save data when the game save transfer device is disconnected from external power.

In the embodiment illustrated in FIG. 2, the computer interface 8 illustrated in FIG. 1 comprises a serial port 26 of the microcontroller 20 and an RS-232 voltage converter 28. The serial port 26 is preferably capable of sending game save data to and receiving game save data from the computer 14. The serial port 26 may comprise the same serial port as the serial port 22. For example, the microcontroller 20 may operate in a first mode for sending game save data to and receiving game save data from the game console 10 and in a second mode for sending game save data to and receiving game save data from the computer 14. In such an embodiment, the same serial port may be used for communicating with the game console 10 and the computer 14. On the other hand, if the microcontroller comprises the PIC16C64A, which includes two serial ports, separate serial ports may be used for communicating with the game console 10 and the computer 14.

The RS-232 voltage converter 28 may comprise any circuit configured to convert voltage levels of signals from the microcontroller 20 to levels for communicating with the computer 14 and vice-versa. For example, the microcontroller 20 may use voltage levels of 3.3V or 5V to indicate a high signal and 0V to indicate a low signal. On the other hand, the serial port of a personal computer may communicate using an RS-232 protocol, including voltage levels of ±5V and 12V. Accordingly, the RS-232 voltage converter includes voltage conversion circuits, such as voltage dividers and inverters, for converting to and from RS-232 voltage levels.

The game save transfer device may connect to the computer in any suitable manner, for example through a cable having a connector. If the game save transfer device is configured to communicate with the serial port of the computer, the connector may comprise a nine-pin connector.

The microcontroller 22 may emulate a conventional memory card to receive game saves from the game console. In order to receive game save data from the game console, the user connects the serial port 22 of the game save transfer device 2 to the memory card interface of the game console 10. The user then provides input to the game console through a game controller connected to the game console to save the current state of a game. The game console may verify that a memory card is connected to the memory card interface. The game console then writes the game save data through the memory card interface to the serial port 22 of the microcontroller 20. The microcontroller 20 converts the serial data into parallel data and writes the parallel data to the memory device 24. Similar operations may be performed to transfer game save data from the memory device 24 to the game console 10.

In this manner, the game save transfer device appears as a conventional memory card to the game console. As a result, modification of existing game consoles is not required in order to send and receive game save data. However, unlike a conventional game system memory card, the game save transfer device is preferably also capable of communicating game saves directly between the game console and the computer 14. According to another aspect, the invention may include a game save transfer manager executed by the computer 14 to control the transfer of game saves to and from the computer 14. A graphical user interface for the game save manager is shown in FIG. 3.

Figure 4A:
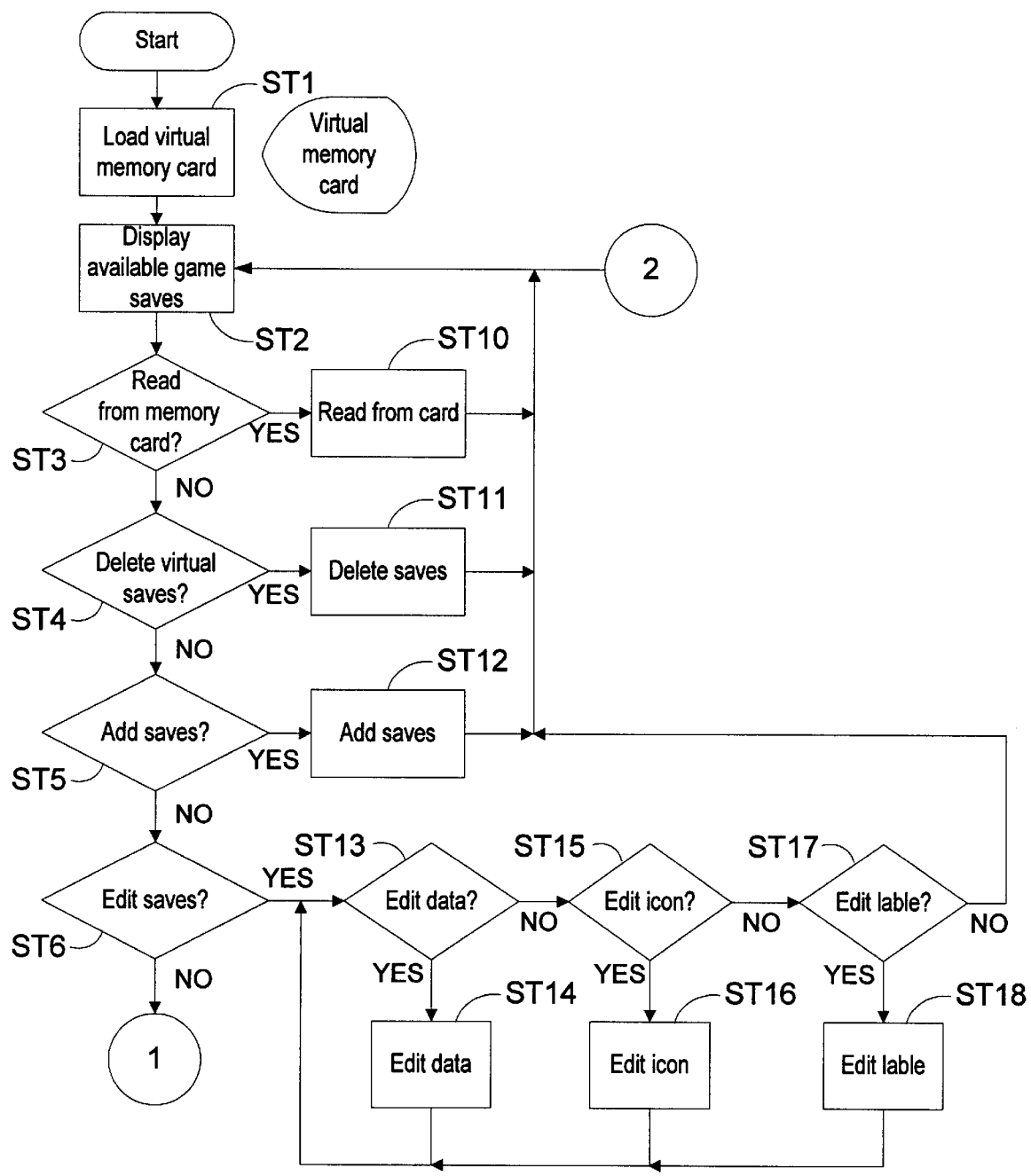
FIGS. 4A and 4B are a flow chart illustrating exemplary steps that may be performed by a game save manager according to an embodiment of the present invention.
Figure 4B:
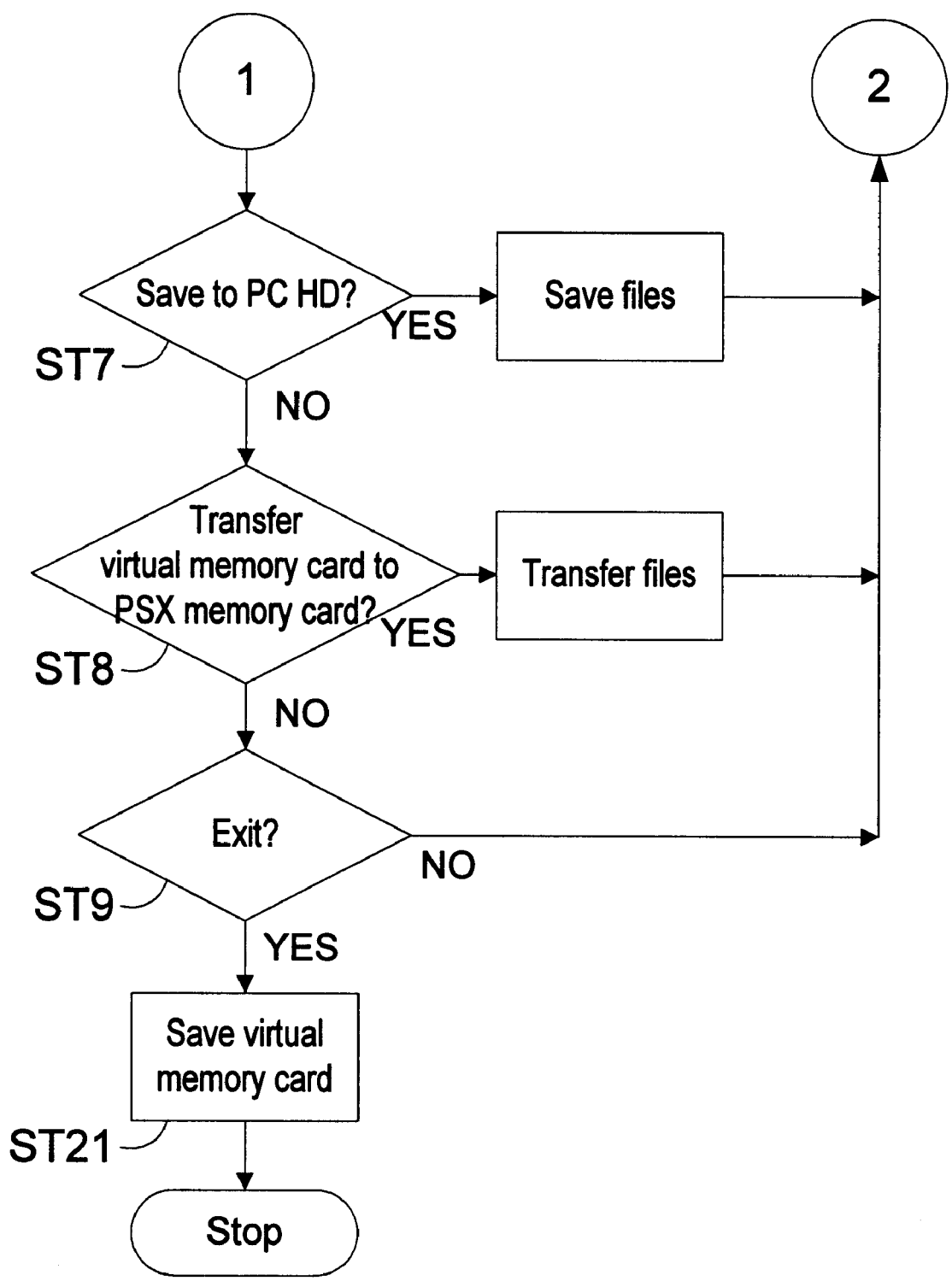

FIGS. 4A and 4B illustrate exemplary steps that may be performed under control of the game save manager according to an embodiment of the present invention. The game save manager may comprise computer executable instructions embodied in a computer-readable medium for controlling the transfer of game saves between the computer and the game console. In a preferred embodiment, the game save manager comprises a windowed application executable by the computer 14. For example, the game save manager may comprise an application program compatible with a graphics-based operating system, such as "Windows 95", "Windows 98", and/or "Windows NT", available from Microsoft Corporation.

Figure 3:
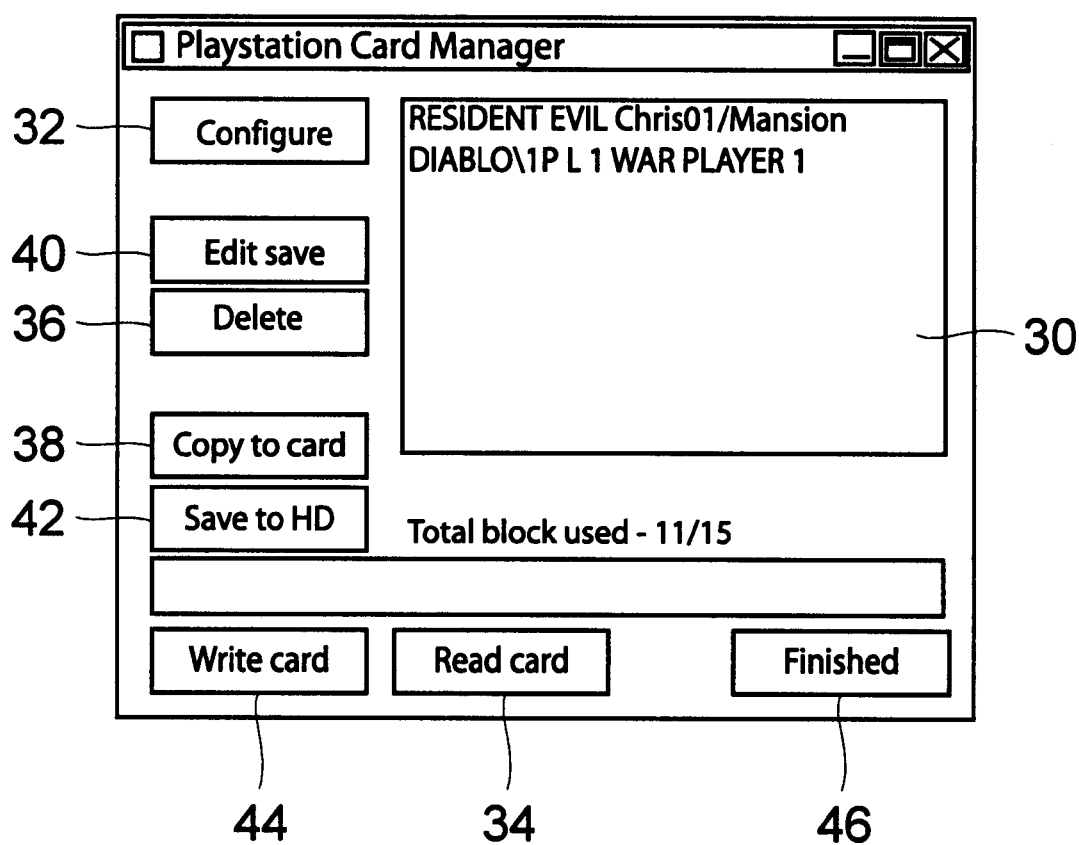
FIG. 3 illustrates an exemplary graphical user interface for the game save manager of the game save transfer device.

The game save manager interface shown in FIG. 3 includes a number of buttons as well as a listing window. The operation of the game save manager is described in combination with the flow chart of FIGS. 4A and 4B. After start of the program, in Step ST1, the game save manager loads a virtual memory card into main memory of the computer 14. Loading the virtual memory card includes establishing a memory format matching the format of a memory card used with the game console. Loading the virtual card may also include copying games saved by the game save manager during a previous execution of the game save manager. The virtual memory card emulates, in memory, a memory card format for transferring same saves and edits as described below. In Step ST2, the game save manager displays available game saves to the user. The list of available game saves appears in the listing window 30 shown in FIG. 3. As described below, this list of available game saves can be altered through additions, deletions, and modifications of existing game saves. In the initial installation of the game save manager, the speed of communication between the computer 14 and the microcontroller 20 through the serial port 26 can be adjusted by choosing the configure button 32 of the game save manager of FIG. 3. Typically, a pull down menu provides a selection of speeds. Likewise, the communication port through which the game console 10 is connected to the computer 14 needs to be identified in the configure step.

Based upon the loading of the virtual memory card and the display of available game saves, any of the other buttons of the game manager can be selected. As explained in greater below, these buttons correspond to Steps ST3–ST9 shown in FIGS. 4A and 4B. Those steps are shown as sequential in that flow chart and may represent the actual execution of the game save manager program. However, to the user, each of Steps ST3–ST9 functions independently. If the read card button 34 is selected, corresponding to Step ST3, a request is being made to read a game save from a memory card connected to the game console 10. This step is executed in Step ST10 of FIG. 4A by the sending of a read command from the computer 14 through the game save transfer device 2. There, the data is converted into parallel format and sent by the microcontroller 20 to the game console 10 retrieve a new game save from the memory device 24. This new game save is then added to the virtual memory card within the hard disk of the computer 14 and the name of the game save is added to the list in the listing window 30. This game save can then be subjected to other processes as described below. Upon entry of the name of the game save in the listing window 30, the process of FIG. 4A returns to Step ST2.

If it is desired to remove any of the game saves stored in the virtual memory card established in the computer 14, then a game save in the listing window 30 is selected and the Delete button 36 of the game save manager of FIG. 3 is selected. In Step ST11, the delete command is executed within the computer 14, deleting a game save and the process returns to Step ST2 with one fewer entry appearing in the listing window 30.

If it is desired to add a game save already present in the virtual memory card to a memory card in the game console 10, then, at Step ST5, the copy to card button 38 of the game save manager is selected. Upon that selection, in Step ST12, the computer 14 sends the selected game save to the game save transfer device 2 through the serial port 26 and the microcontroller 20. The microcontroller converts the game save data format from serial to parallel data and supplies that data for storage in the memory device 24.

An important feature of the invention is the ability to edit game saves. To invoke that capability, the Edit save button 40 of the game save manager of FIG. 3 is selected, as indicated in Step ST6 of FIG. 4A. Execution of that step causes a different window, i.e., graphical user interface, to be displayed, the window illustrated in FIG. 5. That window, providing for editing of data, is displayed upon the execution of Step ST13 of FIG. 4A.

Figure 5:
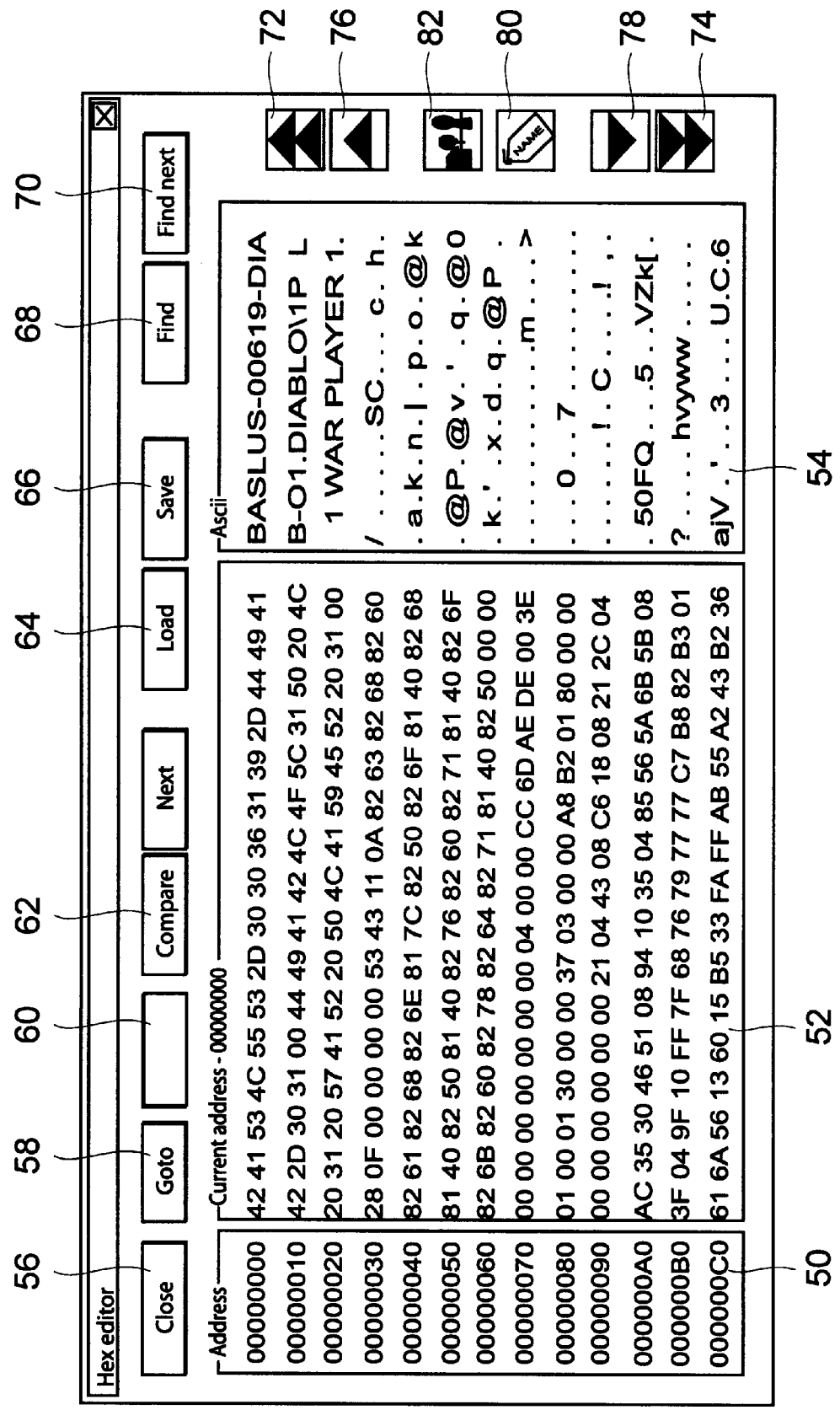
FIG. 5 illustrates an exemplary graphical user interface of a game save editor according to an embodiment of the present invention.

The game save editor, allowing a user to edit game saves stored in the memory of the computer 14 using a graphical interface, is an important aspect of the invention. As shown in FIG. 5, the interface is divided into a first display area 50 for displaying memory addresses of game save data, a second display area 52 for displaying game save data in hexadecimal format, and a third display area 54 for displaying game save data in ASCII format. The address data displayed in the first display area 50 includes the memory addresses of the virtual memory card in the computer memory where game save data is stored. As shown in FIG. 5, these addresses are displayed in hexadecimal form. The hexadecimal data in the second display area 52 includes the actual game save data read from the hard disk of the computer. The data may have been extracted from the memory 24 of the game save transfer device 2 and stored in the hard disk of the computer, in Step ST3 when button 38 is selected. The ASCII data in the third display area 54 corresponds to the hexadecimal data in the second display area 52.

The graphical user interface of FIG. 5 also includes a plurality of buttons for executing game save editor functions, the edit data Step ST14 of FIG. 4A. For example, in the illustrated embodiment, the interface includes a Close button 56 for closing the interface and a Goto button 58 for accessing a specified address. The address is specified by a user in an address window 60. The interface may also include a Compare button 62 for comparing the currently displayed game save with a game save previously loaded. Any differences are directly indicated in the display, for example, by a changed color of the entries that differ between the two game saves. A Load button 64 loads a game save from the hard disk of computer 14 to main memory so that the contents of the game save can be displayed in the interface for editing. A Save button 66 saves displayed game save data to a storage device, such as the hard disk of the computer 14. A Find button 68 opens a find window (not shown), allowing searching for game save data in ASCII or hexadecimal formats. A Find Next button 70 locates the next occurrence of the specified ASCII or hexadecimal format data within a game save. Page up and page down icons 72 and 74 allow a user to move the display of game save data up and down in increments of one page. Similarly, line-up and line-down icons 76 and 78 allow the user to move the display of game save data up and down in increments of one line. The graphical interface for the editor may also include a tag icon 80, which allows the user to update the title of the game save. Finally, an icon editor button 82 allows a user to edit icons associated with each game save. Icon editing is described in detail below.

The game save editor provides the ability to edit a game save in numerous ways in response to a user's instruction. Initially, the game save editor loads the game save selected in Step ST2. Then, in response to selection of Step ST6, the game save is displayed in the display areas 50, 52, and 54 with data addresses and the game data displayed in hexadecimal format. The data is also displayed in ASCII format. In loading the game save data in the interface illustrated in FIG. 5, the game save editor may read header information associated with game save information and provide the user with a graphical display of choices of stored game saves.

After the game save is loaded and the game save editor is selected as shown, for example in FIG. 5, editing of data may be carried out directly or by finding data to be edited by address.

In editing data directly, a user may position the cursor of the game save editor in one of the areas 52 and 54. The hexadecimal and ASCII areas accept input from a user, modifying the displayed game save data. By using the page up and page down buttons 72 and 74 or the line up and line down buttons 76 and 78, the entire game save may be scrolled through so that user can change all of the entries that are desired to be changed. Changes are made by direct keyboard entries by selecting the desired items either in hexadecimal or ASCII format with the cursor. If a particular entry in the game save data is to be located and changed repeatedly, the Find button 68 can be selected. Upon that selection, another Find window (not shown) appears for entry of the data of interest in either hexadecimal or ASCII format. Upon entry of the data value, in whatever format, and actuation of a button in the Find window, the desired entry is located and displayed for modification by the user. Preferably, the Find button also provides an alternative to searching all of the game save data from the beginning of the game save to locate the designated data entry. In the event the Find function is employed, after modification of the designated hexadecimal or ASCII entry, the Find Next button 70 can be selected so that the search for the designated value is reactivated and the next entry of the designated value is located and identified for potential modification. Repeated selection of the Find Next button 70 allows a user to modify each of the corresponding data entries in a game save.

Alternatively, the game save data can be edited based upon the address of the data desired to be altered. The address is entered by the user in the window 60 followed by selection of the Goto button 58. The designated address or addresses covering a range including the designated address then appears in area 50 of the game save editor and corresponding game data appears in areas 52 and 54. The user can then easily locate the data desired to be edited and make the changes using the cursor and keyboard input.

At the conclusion of the desired editing steps, the Compare button 62 can be selected to compare the edited game save with the game save retrieved from the hard disk, i.e., before editing. Each difference between the saved and edited game save is then indicated in the areas 52 and 54, for example, by displaying the edited data entry in a different color. Selection of the Next button 62 steps the game save forward on the display so that the next subsequent edited data item is in the user's view. The compare function assists the user in making omitted desired edits or in correcting edits but not intended.

Figure 6:
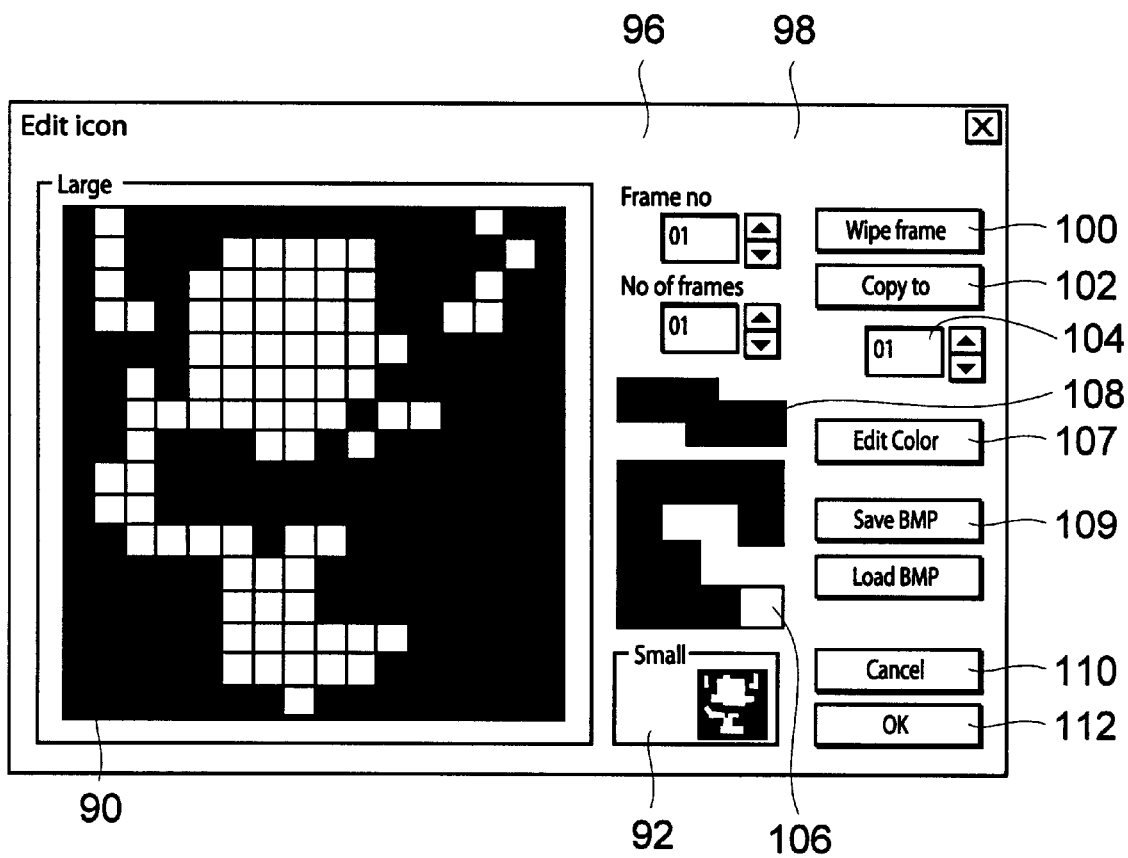
FIG. 6 illustrates an exemplary graphical user interface of an icon editor according to an embodiment of the present invention.

As shown in FIG. 4A, upon the conclusion of a data edit process in Step ST14, the flow returns to the Step ST13 to determine whether further editing of data is appropriate. If not, according of FIG. 4A, a determination is made as to whether icons are to be edited in Step ST15. In order to activate icon editing, the button 82 of the game save editor is selected, causing an icon editing graphical interface. This interface, shown in FIG. 6, may overlay the game save editor interface. The icon editor interface includes a large window 90 in which an icon is displayed in a format that shows each pixel comprising the icon. For example, in the interface of FIG. 6, the icon is square and includes 16 pixels on a side. In a smaller icon window 92, the image of the icon, in much smaller size so that individual pixels are not displayed and the effect of the complete icon can be comprehended, is shown. Thus, the icon can be edited by changing individual pixels in the large window 90 with the visual effect being directly viewable in the small window 92.

For icons already stored in the hard disk, the process of editing begins by selecting the Load BMP button 94 which loads into the editor an icon in the form of a bit map from the hard disk of the computer 14. In a typical application, a game may have up to three icons in one game save. By coordinating the display of the icons, a simple animation effect can be achieved. The icon that is being edited is indicated in a frame number window 96. The total number of frames available appears in window 98. The buttons at the sides of these windows allow a selection of the frame number and the total number of frames that are to be employed in a particular icon.

If the windows 90 and 92 are to be cleared, then the Wipe frame button 100 is selected. If an icon has been edited, it can be placed in the list of frames by selecting the desired frame in a window 104 and selecting the Copy to button 102. If the color of a pixel in an icon is to be altered, a different color is selected from a palette, as described below, with a cursor and indicator, such as a mouse, and the cursor is then used to select a pixel in the large window 90 and the pixel is changed in color.

The icon editor includes palettes 106 and 107 of colors. In the palette 106, a variety of colors are displayed for selection with the cursor. If different colors are to be used or if the range of colors in the palette 106 is to be changed, the Edit color button 107 is selected. A color adjustment window appears (now shown) in which hues can be changed, for example, by selecting different intensities of the primary colors. The selected color appears in a window, i.e., palette, 108 and on palette 106, and can be directly substituted, pixel-by-pixel, in the larger window 90. Existing colors in the icon may also be altered in the course of altering the reference selected color using the Edit color button 107.

Once the editing of the icon is complete, the icon, pixel by pixel, is stored in the hard disk in the virtual memory card upon activation of the Save BMP button 109. The icon is stored as a bit map. If, after beginning the icon editing process, it is determined that no editing is required, selection of the Cancel button 110 closes the icon editor without recording any changes that may have been indicated in the icon. When the changes in the icon are satisfactory and are to be saved, then the Ok button 112 is actuated, closing the icon editor graphical interface and saving the edited icon or icons. These editing steps are indicated by the Step ST16 in FIG. 4A.

When both game save editing and icon editing, if any, are completed, the user selects the Save button 66, and the modified game save and any modified icons are saved in the hard disk of computer 14, where they can be accessed by the control program and written into the memory device 24, such as a memory card, or recalled for further editing. Thereafter, the card manager window of FIG. 3 returns. In that interface, the Label button 80 of the editor graphical user interface may be selected, corresponding to Step ST17 of FIG. 4A. When that selection is made, another graphical interface (not shown) opens so that changes in the name of the edited game save, indicating the editing made, can be entered in Step ST18. The desired label is typed in an appropriate window and accepted by selecting an Ok button or rejected by selecting a Cancel button, with the result that the description of the edited game save desired by the user appears in the listing window 30 of the game save manager, as shown in FIG. 3.

In Step ST7 of FIG. 4B, after selection of the desired game save from the listing window of the game save manager, button 42, Save to hard disk, is selected and, in Step ST19, the selected edited game save is stored in the hard disk of the computer 14. The game save is stored in the virtual memory card in response to this specification. If it is then desired to transfer the game save from the virtual memory card on the hard disk of the computer to memory device 24, i.e., the memory card, then the Copy to card button 38 of the game save manager is selected. This step corresponds to Step ST8 of FIG. 4B and the file transfer actually occurs in the execution of the transfer file Step ST20. Step ST8 may also represent selection of the Write card button 44 of FIG. 3. When the Write card button 44 is selected, the entire contents of the virtual memory card in the hard disk is transferred to the memory card, i.e., the memory device 24.

Finally, when game save editing and game save transfers and storage are completed, selection of the Finished button 46, corresponding to Step ST9 closes the game save manager. At Step ST21, before exiting the program, the contents of the virtual memory card within the hard disk are saved and then the process stops.

Because the present invention allows transfer of game saves from a game console to and from a computer, available memory for storing game saves is virtually unlimited. In addition, because game saves can be modified using the computer, a user can achieve higher levels in playing a game, even without first succeeding at lower levels. In addition, game saves can be transferred to other users utilizing networks, such as the Internet, without physical transfer of a memory card.

FIG. 7 is a pictorial view of a system according to the invention. The system includes a game console memory card 120 having an electrical connection 122 for insertion into an electrical connection with a complementary connector of a video game console. The particular structure illustrated in FIG. 7 is intended for connection to a Sony PlayStation video game console. However, a game console memory card can be readily made for other game consoles or controllers, such as for the Nintendo 64 System. The memory card 120 is unconventional and includes a microprocessor corresponding to the processor circuit 4 of FIG. 1. The card 120 generally corresponds to the game transfer device 2 of FIG. 1. The game system memory card 120 includes a visual indicator 124, for example, a light emitting diode, indicating that the memory card is active. A cable 126 extends from the memory card to a connector 128, for example, a serial port connector for a personal computer. The cable 126 connects to a game console interface within the memory card 120 that corresponds to the game console interface 6 of FIG. 1. A personal computer 130 is connected to the card 120 by the connector 128. The system also includes software that provides the graphical user interfaces described above. Typically, the software is provided via a floppy disk 132 that includes executable instructions that are executed by the personal computer 130 to achieve the functions of game save editing and game save transfer between the hard disk within the personal computer 130 and the memory card 120.

While the invention has been described in some detail by way of illustration and example, it should be understood that the invention is susceptible to various modifications and alternative forms, and is not restricted to the specific embodiments set forth. These specific embodiments are not intended to limit the invention but, on the contrary, the intention is to cover all modifications, equivalents, and alternatives falling within the spirit and scope of the invention.

What is claimed is:

1. A system for transferring game saves between a game system and a personal computer and for editing game saves using the personal computer, the system comprising:

a connection device for connecting a game system to a computer; and a computer-readable medium having computer executable instructions for performing steps comprising:

reading a game save, including game save information, stored in a memory associated with a personal computer;

displaying the game save information in at least one of ASCII and hexadecimal formats to a user;

changing the displayed game save information based on input from the user; and storing in the memory of the personal computer the displayed game save information changed by the user as an edited game save.

2. The system of claim 1 wherein the computer-readable medium having computer executable instructions includes instructions for creating a window having a first display area for displaying the game save information in hexadecimal format and a second display area for displaying the game save information in ASCII format.

3. The system of claim 2 wherein the computer-readable medium having computer executable instructions includes instructions for creating a window having a third display area for displaying addresses of the game save information, the first, second, and third display areas being viewable simultaneously.

4. The system of claim 2 wherein the computer-readable medium having computer executable instructions includes instructions for:

changing the game save information displayed in ASCII format in response to input from the user; and updating the game save information displayed in hexadecimal format when the user changes corresponding game save information displayed in ASCII format.

5. The system of claim 2 wherein the computer-readable medium having computer executable instructions includes instructions for:

changing the game save information displayed in hexadecimal format in response to input from the user; and updating the game save information displayed in ASCII format when the user changes corresponding game save information displayed in hexadecimal format.

6. The system of claim 2 wherein the game save information includes at least one icon and wherein the computer-readable medium having computer executable instructions includes executable instructions for performing steps comprising:

displaying the icon in pixel units to the user; and changing colors of pixels of the icon displayed based on input from the user.

7. The system of claim 1 wherein the connection device comprises a cable directly connected to a game system memory card and including a connector for connection to the personal computer.

8. A system for transferring game saves between a game system and a personal computer comprising:

a connection device for connecting a game system to a computer, the connection device including a first interface for communicating with a computer;

a second interface for communicating with a game system through a memory card port; and a processing circuit coupled to the first and second interfaces for transferring game saves between the computer and the game system.

\* \* \* \* \*